United States Patent

Cron

[11] 3,902,001
[45] Aug. 26, 1975

[54] FLOATING CORONA SHIELD

[75] Inventor: James C. Cron, New Stanton, Pa.

[73] Assignee: I-T-E Imperial Corporation, Spring House, Pa.

[22] Filed: Aug. 28, 1974

[21] Appl. No.: 501,152

[52] U.S. Cl. .............................. 174/21 C; 174/73 R
[51] Int. Cl. ............................................. H02g 15/24
[58] Field of Search .......... 174/21 R, 21 C, 21 CA, 174/22 C, 73 R, 36, 28

[56] References Cited
UNITED STATES PATENTS

| | | | |
|---|---|---|---|
| 2,209,152 | 7/1940 | Daniels | 174/21 C X |
| 3,522,362 | 7/1970 | Bahen, Jr. et al. | 174/73 R UX |
| 3,548,071 | 12/1970 | Bahen, Jr. et al. | 174/73 R UX |
| 3,573,341 | 4/1971 | Graybill et al. | 174/22 C |
| 3,610,807 | 10/1971 | Whitehead | 174/21 C X |
| 3,717,717 | 2/1973 | Cunningham et al. | 174/73 R |
| 3,767,840 | 10/1973 | Cronin et al. | 174/21 C X |
| 3,842,187 | 10/1974 | Barkan | 174/21 C X |

Primary Examiner—Arthur T. Grimley
Attorney, Agent, or Firm—Ostrolenk, Faber, Gerb & Soffen

[57] ABSTRACT

A cylindrical corona shield is connected around the end of a bus joint member by means of a wavy spring which connects the outer periphery of the bus joint member to the inner periphery of the corona shield in a flexible manner. The opposite end of the shield telescopes over a cooperating bus joint member when the bus joint connection is made and the corona shield encloses and shields the elements of the joint. Plastic rings in the interior ends of the shield enclose the joint area and prevent particles generated within the joint area from moving outside of the joint.

7 Claims, 8 Drawing Figures

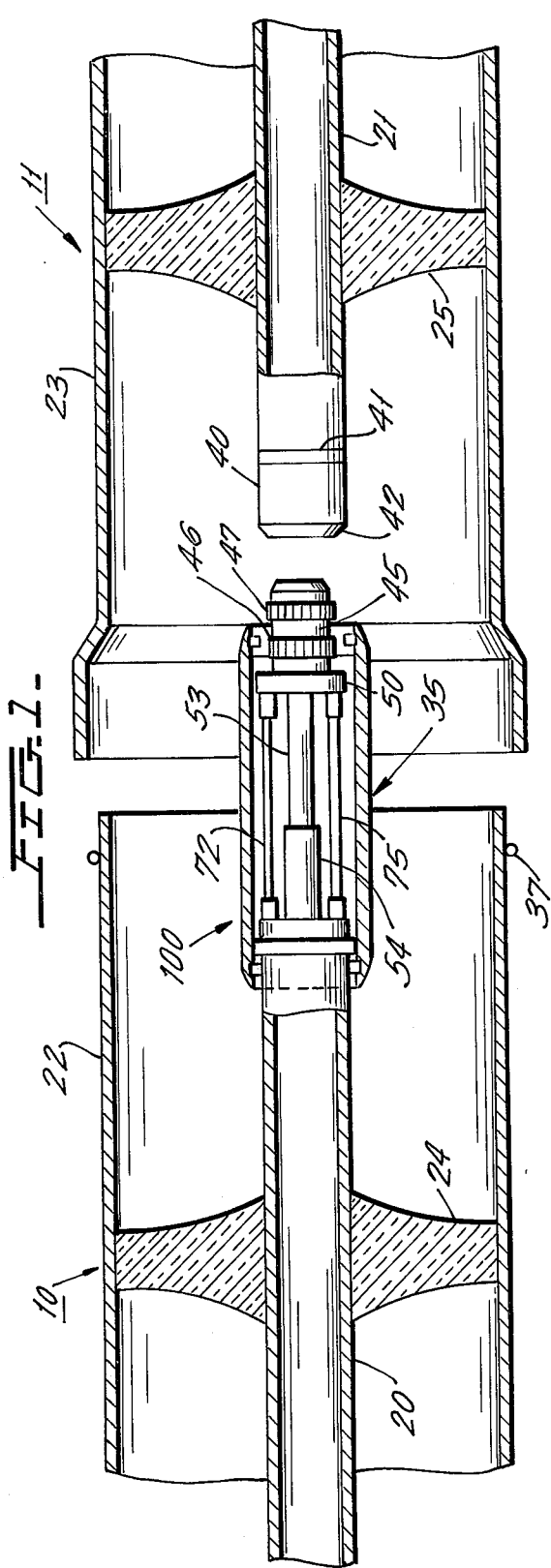
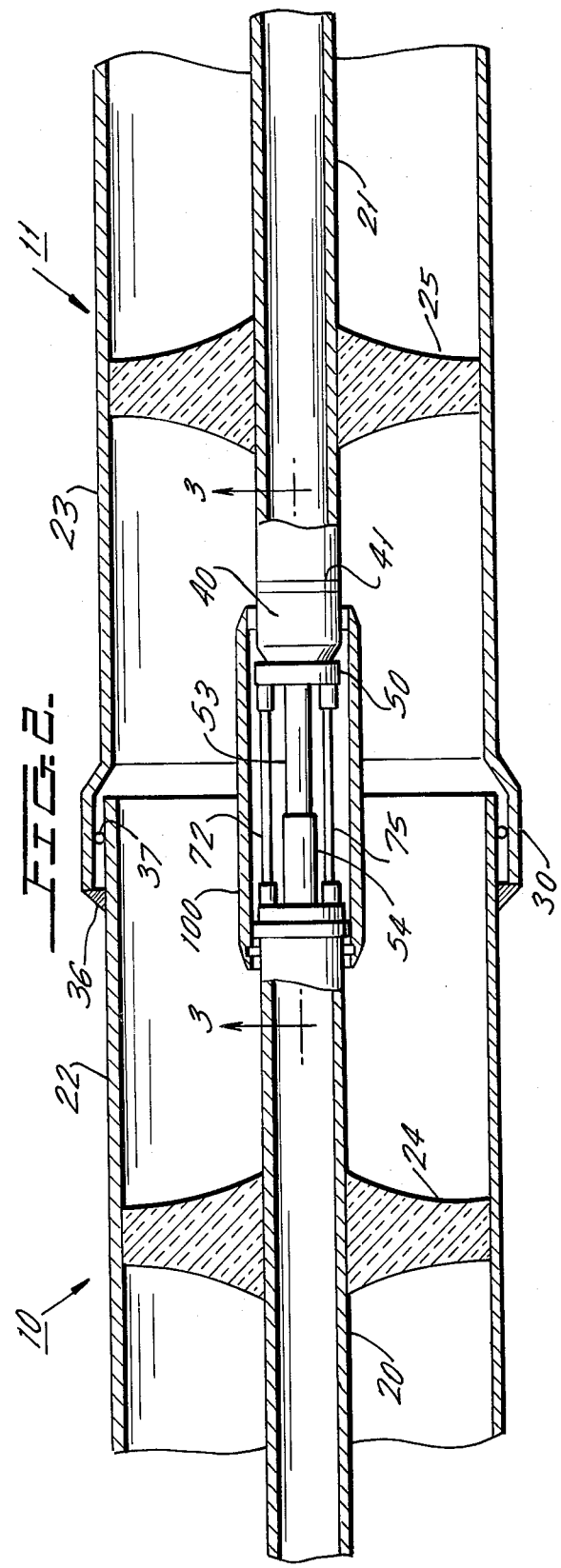

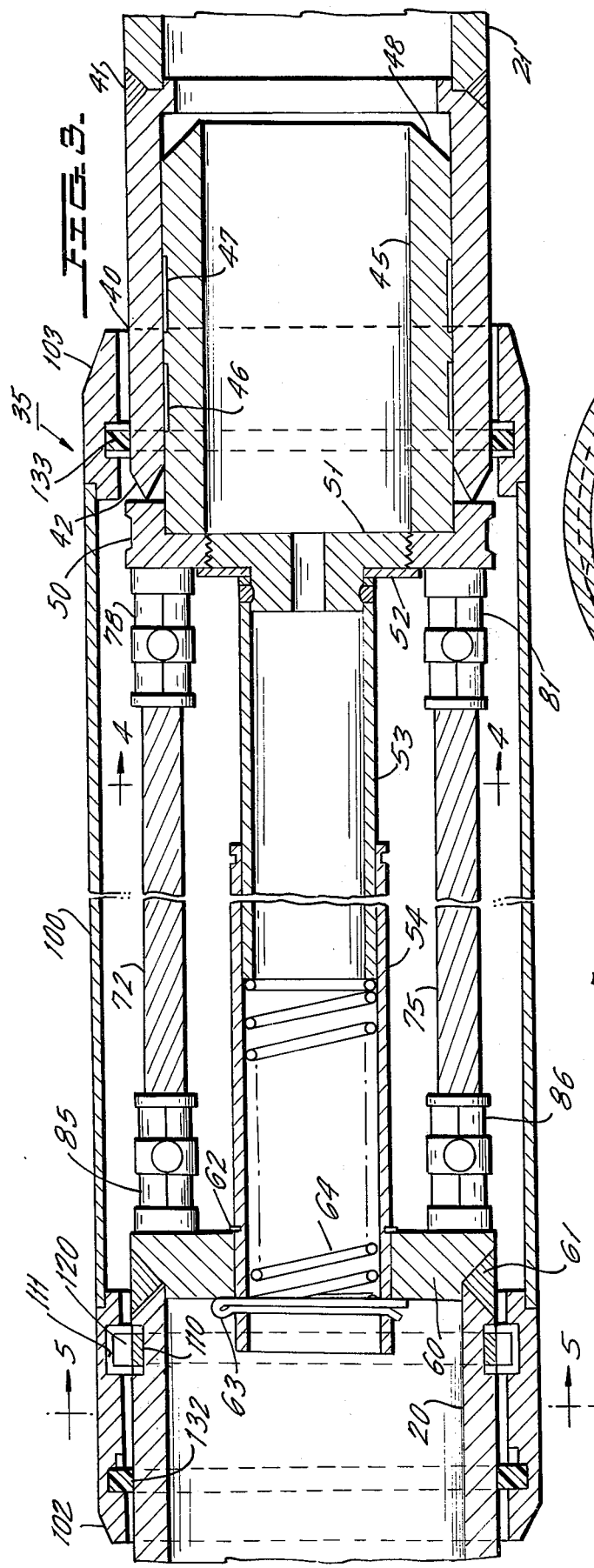

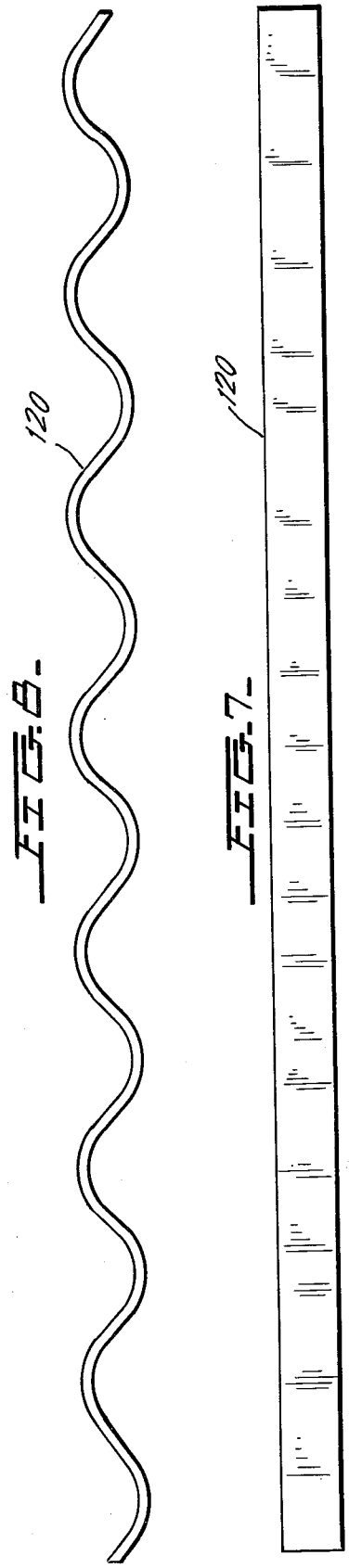
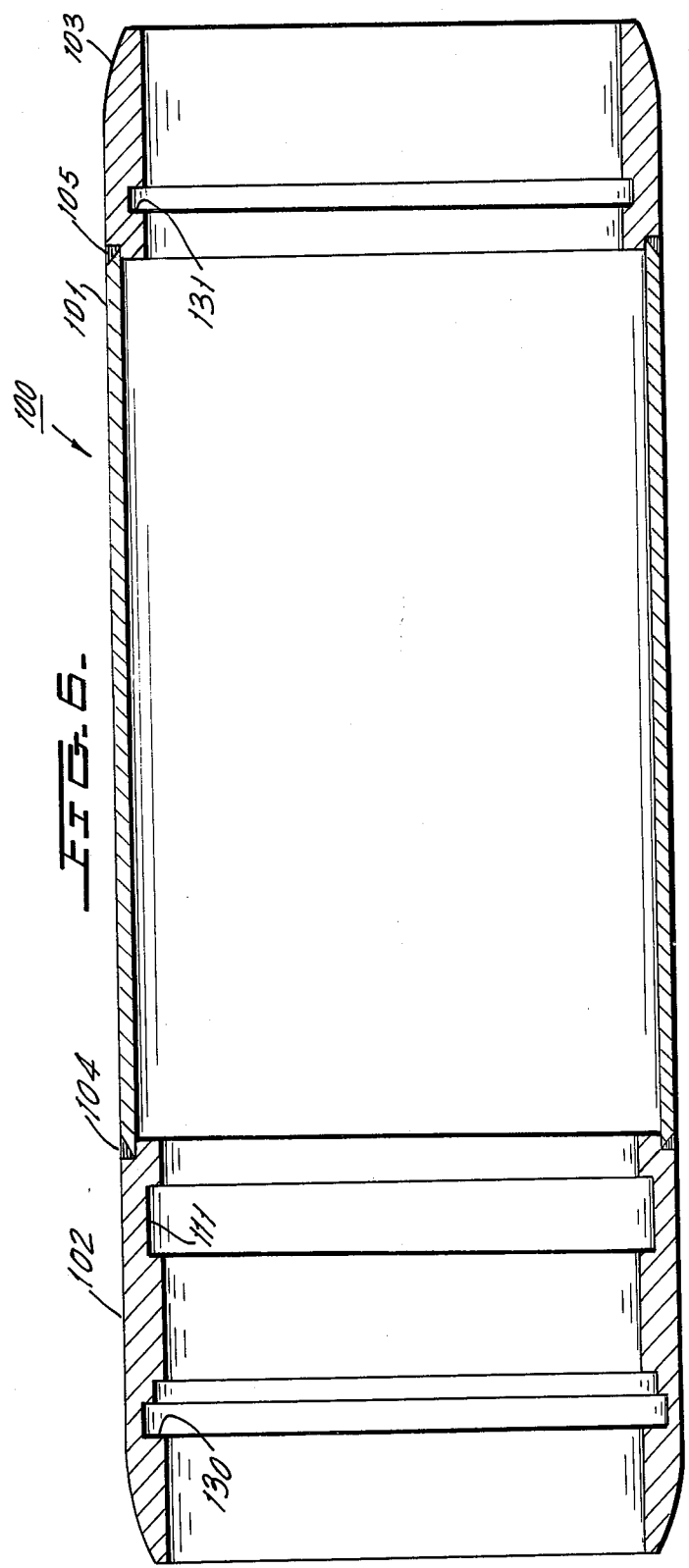

3,902,001

1
FLOATING CORONA SHIELD

RELATED APPLICATIONS

This application is related to copending application Ser. No. 460,537, filed Apr. 12, 1974, entitled PLUG-IN JOINT FOR HIGH CURRENT CONDUCTORS IN GAS-INSULATED TRANSMISSION SYSTEM, in the name of John C. Cronin et al, and assigned to the assignee of the present invention (E-301).

BACKGROUND OF THE INVENTION

This invention relates to a corona shield, and more specifically relates to a corona shield for shielding the joint between two bus terminals in a gas-insulated power transmission system.

Gas-insulated power transmission systems are well known, and are shown, for example, in the above-noted application Ser. No. 460,537. Gas insulated power transmission systems of this type are used in connection with the transmission of electrical power at extremely high voltage, such as 345 KV and consist of a power conductor which is mounted along the center of an elongated grounded housing by suitable spaced insulation support disks or cones. The interior of the grounded housing is then filled with a gas, such as $SF_6$ at some elevated pressure in order to provide a high insulation level between the central conductor and the grounded housing. The conductor sections are made in lengths which can be conveniently subassembled at a manufacturing center and connected together at the site of the transmission line. Thus, lengths of subassembled conductors and housings which might be 60 feet long are provided with connection means on the ends of the bus and housing to permit easy connection between the sections in situ.

The above-noted application Ser. No. 460,537 provides a novel connection structure for connecting adjacent bus ends which allows for misalignment between the axes of the bus ends during the connection process. After the connection is made, a relatively irregular surface exits at the joint which could become a source of corona discharge to the outer housing.

BRIEF SUMMARY OF THE INVENTION

In accordance with the present invention, a novel elongated cylindrical corona shield is provided to enclose the joint between adjacent bus members of a gas-insulated power transmission system. The shield is supported on one of the bus members by a flexible spring assembly which permits a substantial degree of misalignment between the corona shield and the opposite joint member during the assembly process. Moreover, the shield is designed to contain any particles which may be generated in the main power conductor joint so that these particles will not contaminate the dielectric space between the bus and housing. The shield is also easy to manufacture and install and is inexpensive.

Since the shield is not rigidly mounted, it will readily respond to conductor bending or misalignment without causing mechanical stress and without generating conductive particles in the system. The use of a wavy spring or undulating spring strip which is wound around one of the joint conductors and has a snap fit between the joint conductor and one end of the corona shield further permits lateral shield movement without the generation of conductive particles and without causing mechanical stresses in the system.

BRIEF DESCRIPTION OF THE DRAWINGS

FIG. 1 is a longitudinal view partly in cross-section of a gas-insulated transmission line section which incorporates the novel shield of the present invention with the transmission line conductors disconnected from one another.

FIG. 2 is similar to FIG. 1 and shows the transmission line conductors connected to one another.

FIG. 3 is an enlarged cross-sectional view taken across the section line 3—3 in FIG. 2 to illustrate the details of the novel corona shield of the invention in connection with a particular joint construction.

FIG. 4 is a cross-sectional view of FIG. 3 taken across the section line 4—4 in FIG. 3.

FIG. 5 is a cross-sectional view of FIG. 3 taken across the section line 5—5 in FIG. 3.

FIG. 6 is a cross-sectional view of the corona shield of FIGS. 1,2,3 and 5 by itself.

FIG. 7 is a top view of the spring which is used to effect the connection between one end of the corona shield and one of the joint members which terminates the central conductor of one of the gas-insulated transmission line sections.

FIG. 8 is a top view of the spring of FIG. 7 to show its wavy or undulating shape.

DETAILED DESCRIPTION OF THE DRAWINGS

FIGS. 1 to 5 illustrate the novel shield structure in connection with the particular joint construction which is the subject matter of copending application Ser. No. 460,537 identified above. The joint construction per se is first described as follows:

Referring first to FIGS. 1 and 2, there is illustrated therein typical gas-insulated transmission line sections 10 and 11 which are individually factory-assembled and each consist of central conductors or buses 20 and 21, respectively, which could be of aluminum, and which are supported within conductive grounded cylindrical enclosures 22 and 23, respectively. Suitable insulation spacers, such as insulation spacer disks 24, may be spaced along enclosure 22 to support conductor 20 centrally within the enclosure 22 and similar spacers, such as insulation spacer disk 25, support the conductor 21 within enclosure 23. While the insulators 24 and 25 have been shown as disk-type insulators, it will be understood to those skilled in the art that any insulator form, such as conical insulators or the like, could have been used. The interior of each of enclosures 22 and 23 is then filled with a suitable gas under pressure such as sulfur hexafluoride.

The enclosures 22 and 23 of FIGS. 1 and 2 are shown to be of the bell and spigot type wherein the end of bus 22 telescopes into the enlarged diameter end 30 of enclosure 23.

In order to connect adjacent sections 10 and 11 together at the site of installation, the adjacent ends of the bus are brought together from the position of FIG. 1 to the position of FIG. 2. The joint connector 35 of the invention, and which will be described in detail in connection with FIGS. 3 and 4, first allows connection between the ends of central conductors 20 and 21, which may be of aluminum, and, once the sections are in their final position shown in FIG. 2, a weld bead 36 is formed between the end of enclosure 23 and the outer surface of enclosure 22 so that a good electrical and mechanical contact and a good gas-tight seal is formed between the enclosures 22 and 23.

If desired, a contamination seal ring 37 can be formed on the outside of enclosure 22 to prevent contamination products created during the welding of bead 36 from entering the interior of enclosures 22 and 23 in the manner described in copending application Ser. No. 456,901, filed Apr. 1, 1974, in the names of J.W. Katzbeck and J.C. Cron, entitled ELASTOMERIC CONTAMINATION SEAL, and assigned to the assignee of the present invention (E-299).

The joint 35 will permit the connection between the ends of conductors 20 and 21, even though the joint is masked by enclosures 22 and 23, and is described in detail in connection with FIGS. 3 and 4.

Referring first to FIG. 3, the ends of conductors 20 and 21 are shown where the end of bus 21 is provided with one plug member 40, which may be of aluminum, of a telescoping sliding connection. The plug member 40 can be welded to conductor 21 by the weld 41. The end of plug 40 has a taper 42 to enable the plug to be self-locating with respect to its cooperating contact member 45 as will be later described.

Sliding electrical contact is made to plug 40 by the central telescoping aluminum plug member 45 which carries contact strips 46 and 47 (FIGS. 1 and 3). The interior surface of plug member 40 is silver-plated and the exterior diameter of plug member 45 is carefully formed with very close tolerance and the contacts 46 and 47 can be contact strips which make very low resistance contact to the interior surface of plug 40. Note that the end of plug 40 may be beveled at beveled region 48 to enable easy location of the plug 45 into the plug 40 as the bus members 20 and 21 are brought toward one another.

Aluminum plug member 45 is secured to an aluminum ring 50 which may be threadably carried on a stainless steel plug 51. The plug 51 then receives a spacing washer 52 and the end of an inner tube 53 which telescopes into an outer tube 54. Tubes 53 and 54 may be of any desired material such as stainless steel. The outer surface of tube 53 may be covered with a material to define a smooth outer surface, such as Teflon tape or the like, which enables easy sliding motion between tubes 53 and 54. The tube 53 is then welded to the plug 51.

An aluminum end plate 60 is welded to the end of aluminum conductor 20 by the weld bead 61. The tube 54 is then fixed to the ring 60 by the retainer ring 62 and cotter pin 63. Pin 63 also serves as a seat for compression spring 64 which presses against the left-hand of tube 53 and tends to separate telescoping tubes 53 and 54.

A flexible electrical connection is then made between the end plate 60 and the ring 50 and includes the braided copper conductors 70 to 75 (FIGS. 3 and 4).

The braided conductors 70 to 75 are preferably of copper. If the other conductors of the system, including rings 50 and 60, are of copper, the braided conductors 70 to 75 can be directly secured to rings 50 and 60 by brazing, or the like. However, if rings 50 and 60 are aluminum, the common precautions in securing aluminum conductors to copper conductors should be exercised. Thus, the braided conductors 70 to 75 may be provided with copper ferrules at one of their ends, such as ferrules 76 to 81 for flexible conductors 70 to 75, respectively, and aluminum crimp connectors at their opposite ends, shown as aluminum crimp connectors 85 and 86 for conductors 72 and 75, respectively, in FIG. 3. The aluminum ring 50 may then have protruding studs which receive connectors 76 to 81, respectively, by crimping and brazing or the like. The ring 60 may also have protruding studs which are connected to aluminum crimp connectors 85 to 86. If desired, further brazing or spot welding can also be used to ensure the connection between the ferrules, such as ferrules 85 and 86 to their respective studs.

The operation of the joint of the invention can now be understood. In order to make a connection, the enclosures are moved from the position of FIG. 1 to the position of FIG. 2. This causes the plug type member 45 to enter the plug type member 40, even though the buses were not absolutely aligned prior to their connection. The telescoping tubes 53 and 54 serve to mechanically position the plug member 45 generally along the axis of bus 20 and plug member 45 is electrically connected to bus 20 through the cable connectors including cables 72 and 75. As the conductors 20 and 21 move toward one another, the plug member 45 enters plug 40 and sliding contacts 46 and 47 make good low resistance contact to the interior surface of plug member 40. Once the end of plug member 40 engages ring 50, as shown in FIG. 3, full contact is made and continued movement of bus 20 toward bus 21 will simply cause telescoping members 53 and 54 to enter one another more completely and will cause the flexing of the flexible conductors, such as conductors 72 and 75. Preferably, if the plugs 40 and 45 are fully connected in the position of FIG. 3, the bus 20 should continue to be moved toward bus 21 for at least one inch to ensure loose play in the flexible conductors, such as conductors 72 and 75 before the enclosures 22 and 23 are in position to be welded together. These are dimensions that can be easily obtained by appropriately fixing the positions of the ends of conductors 20 and 21 relative to the ends of their respective outer housings 22 and 23.

Once the bus is so connected and the housings welded, all changes in the position of conductors 20 and 21, due to thermal expansion or contraction, will be taken up by the relative movement of telescoping members 53 and 54 and the extension or bending of the flexible cables, such as cables 72 and 75 of FIG. 3. There will, however, be no sliding action between plug members 40 and 45 and these members will remain fixed in place relative to one another to ensure a low resistance joint and to prevent the formation of metallic particles due to a sliding contact.

DETAILED DESCRIPTION OF THE IMPROVEMENT OF THE PRESENT INVENTION

In accordance with the present invention, the joint structure of FIGS. 1 to 5 is enclosed by a corona shield 100 where the corona shield 100 encloses the various sharp edges and protrusions of the joint configuration that could initiate partial discharge or corona in the gas within the enclosure 22. The corona shield 100 is shown by itself in FIG. 6 and consists of an elongated cylinder 101 which is welded to end rings 102 and 103 at welded joints 104 and 105, respectively. The internal diameter of rings 102 and 103 is slightly larger than the external diameter of end plate 60 and plug 40 respectively.

The end plate 60, as best shown in FIG. 3, is provided with an annular channel or groove 110 which is located immediately adjacent a corresponding channel 111 in ring 102. As will be later described, the channels or grooves 110 and 111 form a main annular channel which receives a wavy spring 120 which is wrapped into and is radially compressed in the channel in order to form a flexible connection between corona shield 100 and end plate 60.

Rings 102 and 103 are further provided with annular recesses 130 and 131 respectively which recesses receive urethane wiper rings 132 and 133 which are commonly used to form a good sliding seal to a smooth surface. It will be noted that ring 132 encloses the confronting annular area of end member 60 while ring 133 encloses the confronting annular area of member 40. These two rings then cause the volume within shield 100 to be sealed so that any particles generated within the joint will be sealed within the joint when the joint is completed.

The spring 120 of FIG. 8 is formed from a thin strip of any spring type material such as a thin phosphor bronze element. A plurality of convolutions (for example, six convolutions) are formed in the strip as shown in FIG. 8 and the total length of the wavy spring will be approximately equal to the circumference of end member 60.

In order to install the shield, as will be best understood from FIG. 3, the spring 120 is first fitted into the annular groove 111 in member 102. This notch may be about one-half inch wide and one-eight inch deep and the spring 120 will have a width slightly less than one-half inch with a total excursion somewhat greater than about one-half inch.

The wavy spring 120 is then pressed outwardly by hand or by a suitable tool and the left-hand end of shield 100 and thus the ring 102 slides over the joint members 45, 51, 72 and 60 until the spring 120 snaps into groove 110. Groove 110, like groove 111, may have a depth of about one-eighth inch and a width of about one-half inch.

Once the spring 120 snaps into place in groove 110, the shield 100 will be flexibly mounted onto end member 60 so that the shield 100 can move angularly and laterally to absorb any misalignment during the closing of the joint as shown in FIG. 2. Moreover, the spring 120 will ensure good electrical contact between the shield 100 and the central conductor to which it is secured. Once the shield 100 is in place and the joint is closed as in FIG. 2, it will be further noted that the seals 132 and 133 will cause a mechanical seal of the volume within the shield 100 so that particles generated in the joint cannot reach the gas-filled region which is external to the shield.

It will be noted that the novel shield of the present invention can always respond to conductor movement without causing mechanical stress and, moreover, that the shield is easy to install in the field.

Although there has been described a preferred embodiment of this invention many variations and modifications will now be apparent to those skilled in the art. Therefore, this invention is to be limited, not by the specific disclosure herein, but only by the appended claims.

The embodiments of the invention in which an exclusive privilege or property is claimed are defined as follows:

1. A corona shield for covering the connection between first and second elongated high voltage conductor members; said first and second elongated conductor members comprising elongated conductive cylinders with smooth outer surfaces and having joint contact means at their ends; said joint contact means of said first and second elongated conductor members being connected to one another; said corona shield comprising a hollow conductive cylinder having smoothly curved ends surrounding said connected joint contact means and connection means for flexibly connecting said corona shield to said first conductor member; said connection means comprising an undulating metallic strip formed in a band and being formed of a material which is capable of elastic radial deflection; the interior diameter of said corona shield near one end thereof having a first annular channel therein; said first conductor member having a second annular channel therein which confronts said first annular channel in said corona shield; said undulating strip being flexibly disposed in the annular volume formed between said first and second annular channels, thereby to flexibly secure said corona shield on said first conductor member.

2. The corona shield of claim 1 which further includes first and second annular seal wiper rings disposed within said corona shield adjacent its opposite ends; said first and second annular seal wiper rings engaging the outer surface of said first and second elongated conductor members respectively, thereby to seal said joint contact means within said corona shield.

3. The corona shield of claim 1 wherein said undulating strip is radially compressed within said annular volume.

4. The apparatus of claim 1 which further includes gas-filled grounded housing means and insulation support means for supporting said first and second elongated conductor members within said grounded housing means.

5. The apparatus of claim 1 wherein said joint contact means of said first and second conductor members permits continuous relative movement between said first and second conductor members after said first and second conductor members are connected to one another.

6. The apparatus of claim 3 which further includes gas-filled grounded housing means and insulation support means for supporting said first and second elongated conductor members within said grounded housing means.

7. The apparatus of claim 5 which further includes gas-filled grounded housing means and insulation support means for supporting said first and second elongated conductor members within said grounded housing means.

* * * * *